(12) United States Patent
Koh et al.

(10) Patent No.: US 11,417,476 B2
(45) Date of Patent: Aug. 16, 2022

(54) STEERING WHEEL REMOTE CONTROL FOR VEHICLE AND VEHICLE INCLUDING THE SAME

(71) Applicants: HYUNDAI MOTOR COMPANY, Seoul (KR); KIA MOTORS CORPORATION, Seoul (KR)

(72) Inventors: Jin Young Koh, Suwon-si (KR); Yun Ho Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 21 days.

(21) Appl. No.: 16/952,457

(22) Filed: Nov. 19, 2020

(65) Prior Publication Data

US 2022/0001909 A1 Jan. 6, 2022

(30) Foreign Application Priority Data

Jul. 3, 2020 (KR) .................. 10-2020-0082347

(51) Int. Cl.
| | |
|---|---|
| *H01H 13/14* | (2006.01) |
| *H01H 3/12* | (2006.01) |
| *B62D 1/04* | (2006.01) |
| *H01H 19/10* | (2006.01) |
| *H01H 13/70* | (2006.01) |
| *H01H 19/04* | (2006.01) |

(52) U.S. Cl.
CPC ............... *H01H 3/12* (2013.01); *B62D 1/046* (2013.01); *H01H 13/14* (2013.01); *H01H 13/70* (2013.01); *H01H 19/04* (2013.01); *H01H 19/10* (2013.01); *B60K 2370/782* (2019.05)

(58) Field of Classification Search
CPC ...... H01H 3/125; H01H 13/705; H01H 13/14; H01H 13/70; H01H 13/704; H01H 13/7065; H01H 13/7006; H01H 13/7057; H01H 13/78; H01H 13/79; H01H 13/52; H01H 13/703; H01H 13/507; H01H 13/20; H01H 3/12; H01H 19/04; H01H 19/10; B62D 1/046; B60K 2370/782
See application file for complete search history.

(56) References Cited

FOREIGN PATENT DOCUMENTS

KR     20130053940     *  5/2013  ......... H04M 1/0277

* cited by examiner

*Primary Examiner* — Ahmed M Saeed
(74) *Attorney, Agent, or Firm* — Morgan, Lewis & Bockius llp

(57) ABSTRACT

A steering wheel remote control for a vehicle includes: a first button and a second button arranged on a top surface of the remote control and configured to move downward when being pressed; and a first printed circuit board (PCB) and a second PCB each of which arranged under the first button and the second button. The first PCB comprises a first switch terminal configured to be pressed downward to perform a first function when the first button moves downward, and the second PCB comprises a second switch terminal configured to be pressed downward to perform a second function when the second button moves downward. The first PCB and the second PCB are spaced apart from each other in a vertical direction.

15 Claims, 10 Drawing Sheets

STEERING WHEEL REMOTE CONTROL FOR VEHICLE AND VEHICLE INCLUDING THE SAME

CROSS-REFERENCE TO RELATED APPLICATION

This application claims the benefit of priority to Korean Patent Application No. 10-2020-0082347, filed on Jul. 3, 2020, in the Korean Intellectual Property Office, the disclosure of which is incorporated herein in its entirety by reference.

TECHNICAL FIELD

The present disclosure relates to a steering wheel remote control for a vehicle and a vehicle including the same.

BACKGROUND

A steering wheel of a vehicle is equipped with a steering wheel remote control having various types of buttons. For example, the steering wheel remote control is equipped with a touch-type button, a scroll-type or tumbler-type button that can be rotated and pressed vertically, etc.

In order for the buttons on the steering wheel remote control to perform respective functions properly, tact switches are provided under respective buttons of the steering wheel remote control. When the buttons are pressed downward, the tact switches are pressed by the buttons, and electrical signals thus generated allow respective functions of the steering wheel remote control to be performed.

According to the related art, however, as the number and types of buttons mounted on the steering wheel remote control increase, the types of tact switches also increase. Due to the interference between the tact switches, there has been a limit on the degree of freedom in designing the steering wheel remote control.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a steering wheel remote control for a vehicle and a vehicle including the same, capable of improving the degree of freedom in designing the steering wheel remote control by resolving interference between tact switches according to the arrangement of the tact switches.

According to an aspect of the present disclosure, a steering wheel remote control for a vehicle may include: a first button and a second button arranged on a top surface of the remote control and configured to move downward when being pressed; and a first printed circuit board (PCB) and a second PCB each of which arranged under the first button and the second button, wherein the first PCB may comprise a first switch terminal which is configured to be pressed downward to perform a first function when the first button moves downward, the second PCB may comprise a second switch terminal which is configured to be pressed downward to perform a second function when the second button moves downward, and the first PCB and the second PCB may be spaced apart from each other in a vertical direction.

The first button may be a top cover provided on the top surface of the remote control, and the second button may be provided within the top cover.

The first PCB may be located below the second PCB.

The steering wheel remote control may further include a pusher provided between the first button and the first PCB, and coming into contact with the first switch terminal and pressing the first switch terminal when the first button moves downward.

The first switch terminal and the second switch terminal may partially overlap each other when the remote control is viewed from top.

The pusher may include: a body portion provided above the first switch terminal and facing the first switch terminal; and an extension portion extending upward from the body portion. When the first button moves downward, the extension portion may be pressed downward and the body portion may press the first switch terminal whereby the first function may be performed.

The extension portion may extend upward through the second PCB.

The steering wheel remote control may further include a block portion provided under the first button, and fixedly coupled to the first button. The extension portion may face the block portion, and when the first button moves downward, the block portion may interfere with the extension portion to press the extension portion downward.

The steering wheel remote control may further include a first plate provided under the block portion. An opening may be provided in the block portion, and the second button and the first plate may face each other through the opening. When the second button moves downward, the first plate may be pressed downward to press the second switch terminal whereby the second function may be performed.

The extension portion may extend upward through the first plate.

The first plate may include a pusher guide member provided adjacent to an area of a bottom surface of the first plate through which the extension portion passes, and extending downward. The pusher guide member may face the extension portion on the side of the extension portion, and a shape of the pusher guide member may correspond to that of the extension portion in an area in which the extension portion and the pusher guide member face each other.

The extension portion may include a first extension portion and a second extension portion, and the first extension portion and the second extension portion may have a symmetrical shape with the body portion placed therebetween.

A horizontal cross-section of the extension portion and a horizontal cross-section of the pusher guide member may have an L shape in the area in which the extension portion and the pusher guide member face each other.

The steering wheel remote control may further include a stabilizer coupled to the block portion on a bottom surface of the block portion, and provided transverse to the block portion.

The block portion may include a first coupling portion and a second coupling portion coupled to both end portions of the stabilizer, respectively, and the first coupling portion and the second coupling portion may extend downward through the first plate.

The first plate may include a coupling portion guide member provided adjacent to an area of a bottom surface of the first plate through which the first coupling portion and the second coupling portion pass, and extending downward. The coupling portion guide member may face the coupling portion on the side of the coupling portion, and a shape of the coupling portion guide member may correspond to that of the coupling portion in an area in which the coupling portion and the coupling portion guide member face each other.

A horizontal cross-section of the coupling portion may include a U-shape section in the area in which the coupling portion and the coupling portion guide member face each other, and a horizontal cross-section of the coupling portion guide member may include an I-shape section inserted into the U-shape section in the area in which the coupling portion and the coupling portion guide member face each other.

A direction in which the first extension portion and the second extension portion face each other may intersect with a direction in which the stabilizer is transverse to the block portion.

The steering wheel remote control may further include a second plate provided under the pusher. The stabilizer may include a projection area protruding downward, and the stabilizer and the second plate may be coupled in the projection area.

The block portion may further include a penetrating portion provided on a peripheral area of the bottom surface of the block portion and extending downward through the first plate.

The first plate may further include a penetrating portion guide member provided adjacent to an area of a bottom surface of the first plate through which the penetrating portion passes, and extending downward. The penetrating portion guide member may face the penetrating portion on the side of the penetrating portion, and a shape of the penetrating portion guide member may correspond to that of the penetrating portion in an area in which the penetrating portion and the penetrating portion guide member face each other.

A horizontal cross-section of the penetrating portion may include a U-shape section in the area in which the penetrating portion and the penetrating portion guide member face each other, and a horizontal cross-section of the penetrating portion guide member may include an I-shape section inserted into the U-shape section in the area in which the penetrating portion and the penetrating portion guide member face each other.

According to another aspect of the present disclosure, a vehicle may include: a steering wheel; and a steering wheel remote control mounted on the steering wheel. The steering wheel remote control may include: a first button and a second button provided on a top surface of the remote control and moving downward; and a first PCB and a second PCB provided under the first button and the second button. The first PCB may be provided with a first switch terminal which is pressed downward to perform a first function when the first button moves downward, the second PCB may be provided with a second switch terminal which is pressed to perform a second function when the second button moves downward, and the first PCB and the second PCB may be spaced apart from each other in a vertical direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a steering wheel remote control and a vehicle including the same according to exemplary embodiments of the present disclosure will be described in detail with reference to the accompanying drawings.

Steering Wheel Remote control

Figure 1:
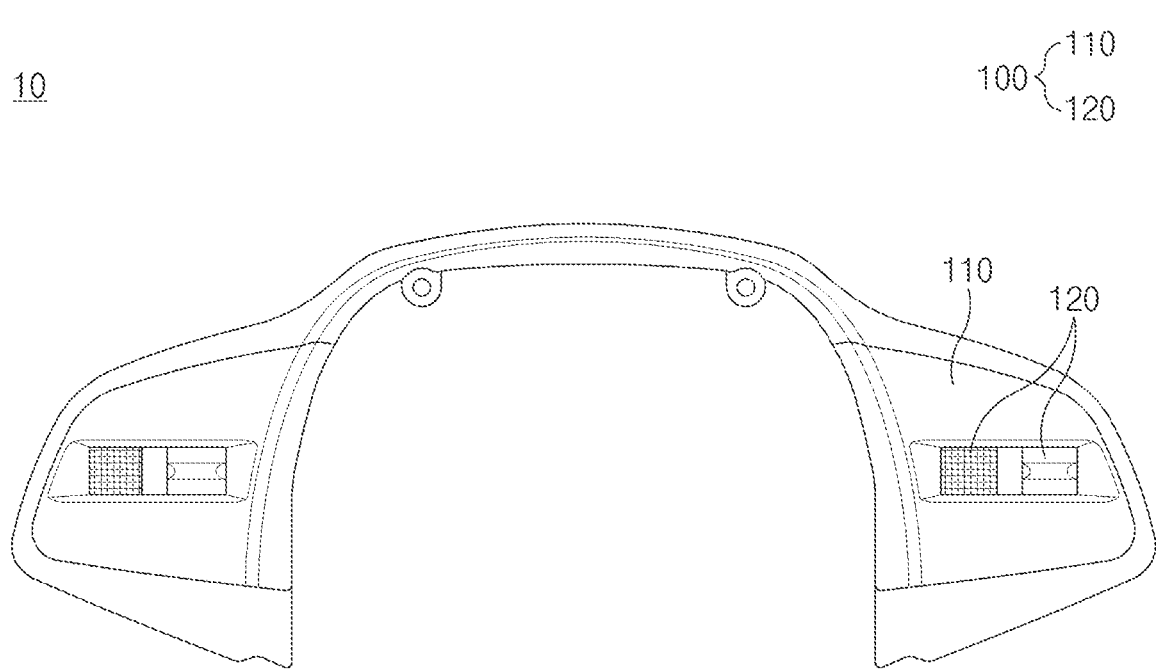
FIG. 1 is a plan view of the overall structure of a steering wheel remote control according to an exemplary embodiment of the present disclosure.
Figure 2:
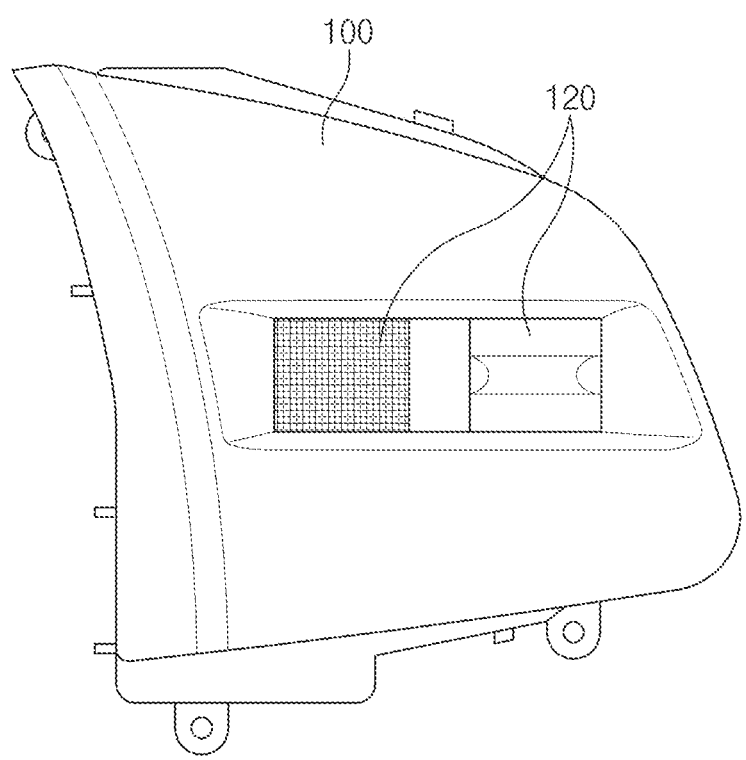
FIG. 2 is an enlarged plan view of first and second buttons in a steering wheel remote control according to an exemplary embodiment of the present disclosure.

FIG. 1 is a plan view of the overall structure of a steering wheel remote control according to an exemplary embodiment of the present disclosure, and FIG. 2 is an enlarged plan view of first and second buttons in a steering wheel remote control according to an exemplary embodiment of the present disclosure.

A steering wheel remote control 10 (hereinafter also referred to as "the remote control") according to an exemplary embodiment of the present disclosure may be mounted on a steering wheel of a vehicle, and include buttons 100 for performing various functions while the driver is driving the vehicle.

More specifically, as illustrated in FIGS. 1 and 2, the remote control 10 may include a first button 110 and a second button 120 provided on a top surface of the remote control 10. The first button 110 and the second button 120 may be configured to move downward. According to an exemplary embodiment of the present disclosure, when the first button 110 and/or the second button 120 is pressed to move downward, a first function and/or a second function may be performed, respectively.

For example, the first button 110 may be a top cover provided on the top surface of the remote control 10. That is, when an area of the top cover in the remote control 10 according to an exemplary embodiment of the present disclosure is pressed downward, the first function may be performed. More preferably, when any area of the first button 110 forming the top cover is pressed downward, the first function may be performed.

The second button 120 may be provided within the first button 110, that is, the top cover. That is, according to an exemplary embodiment of the present disclosure, a through-hole may be defined in an inner portion of the first button 110, and the second button 120 may be provided in the through-hole. The second button 120 may include a plurality of buttons having different structures and functions. For example, the second button 120 may include a scroll-type button which scrolls back and forth and is pressed to move downward, and a tumbler-type button which is pushed up or pulled down and is pressed to move downward.

Figure 3:
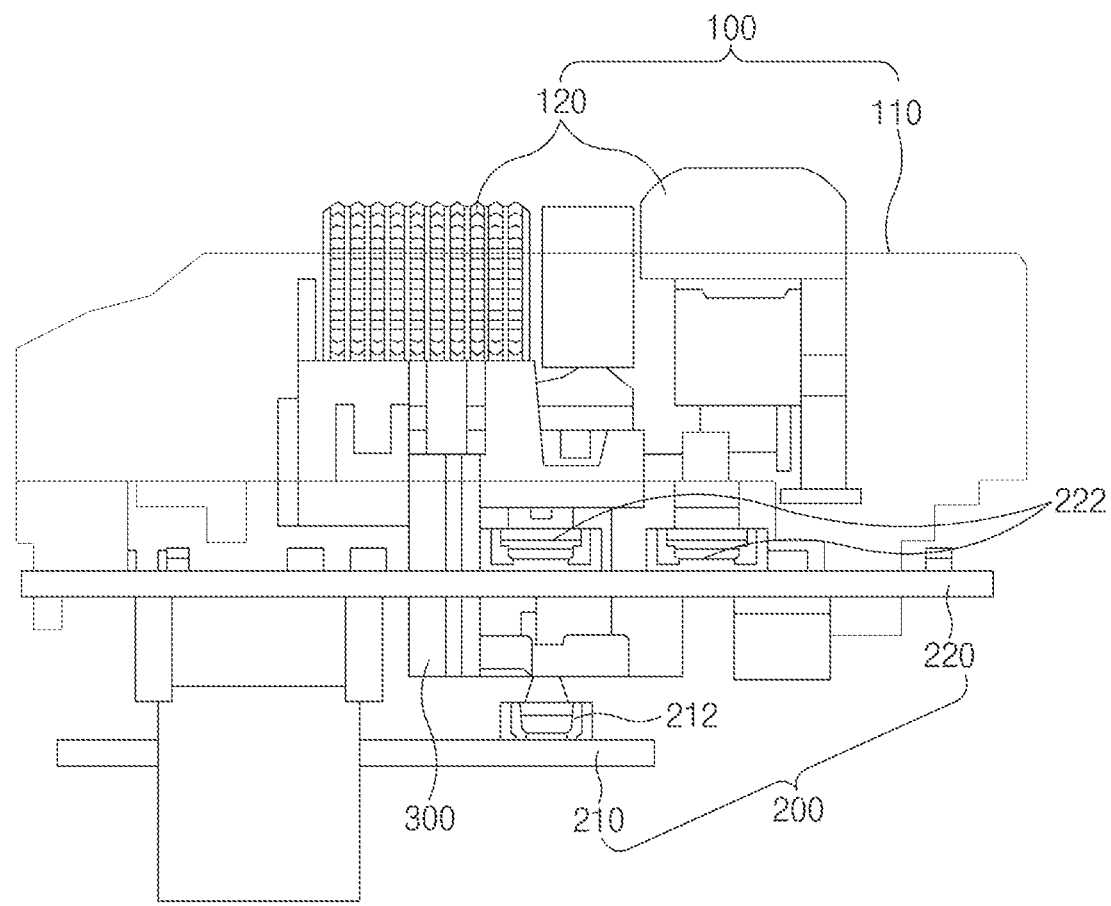
FIG. 3 is a cross-sectional view of a layered structure of a steering wheel remote control according to an exemplary embodiment of the present disclosure.
Figure 4:
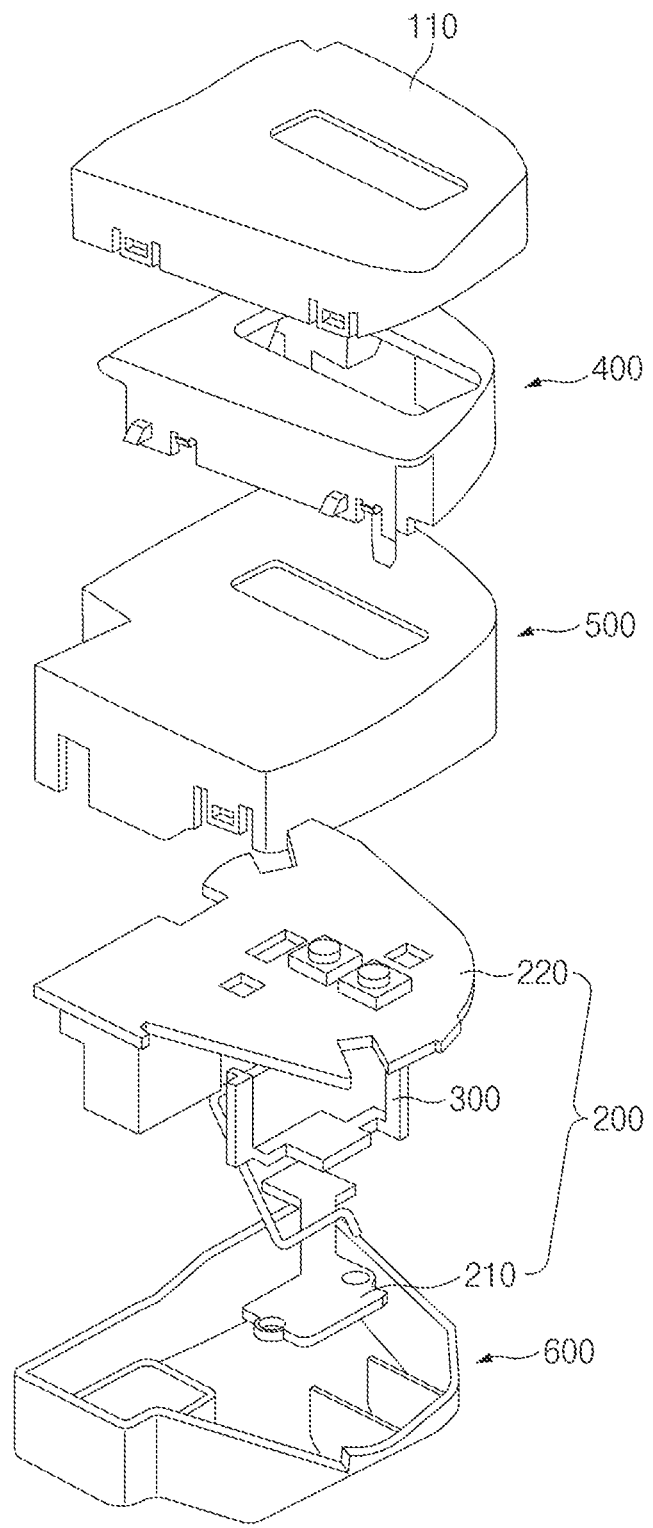
FIG. 4 is an exploded perspective view of a layered structure of a steering wheel remote control according to an exemplary embodiment of the present disclosure.

FIG. 3 is a cross-sectional view of a layered structure of a steering wheel remote control according to an exemplary embodiment of the present disclosure, and FIG. 4 is an exploded perspective view of a layered structure of a steering wheel remote control according to an exemplary embodiment of the present disclosure.

Referring to FIGS. 3 and 4, the remote control according to an exemplary embodiment of the present disclosure may include a printed circuit board (PCB) 200 provided under the first button 110 and the second button 120. More specifically, the PCB 200 may include a first PCB 210 and a second PCB 220. In addition, a first switch terminal 212 may be provided on the top of the first PCB 210 so that it may be pressed downward by the first button 110 to perform the first function when the first button 110 moves downward, and a second switch terminal 222 may be provided on the top of the second PCB 220 so that it may be pressed downward by the second button 120 to perform the second function when the second button 120 moves downward.

According to an exemplary embodiment of the present disclosure, the first PCB 210 and the second PCB 220 may be spaced apart from each other in a vertical direction.

A steering wheel remote control according to the related art has had many restrictions on the arrangement of switch terminals as the plurality of switch terminals are arranged on one PCB board. For example, when a scroll-type button and a tumbler-type button are disposed within a top cover functioning as a button, a switch terminal operated by pressing the top cover and a switch terminal operated by pressing the scroll-type or tumbler-type button are arranged on one PCB. In order for the function of the top cover to be smoothly performed as the button even when any area of the top cover is pressed, the switch terminal for the top cover needs to be disposed under a central area of the top cover. However, this causes the switch terminal for the top cover to overlap the position of the switch terminal provided under the scroll-type or tumbler-type button, the degree of freedom in the arrangement of the switch terminals has been significantly limited.

However, the remote control according to an exemplary embodiment of the present disclosure may have a layered structure in which a plurality of PCBs are layered vertically. When viewed from the top of the remote control, the plurality of switch terminals may be disposed in an overlapping position. Thus, according to an exemplary embodiment of the present disclosure, the degree of freedom in designing the steering wheel remote control having the above-described button functions may be significantly improved. In particular, the aforementioned effect of the remote control may be maximized when the first switch terminal 212 and the second switch terminal 222 partially overlap each other. Thus, according to an exemplary embodiment of the present disclosure, the first switch terminal 212 and the second switch terminal 222 may partially overlap each other when the remote control 10 is viewed from the top.

Referring to FIG. 3, in the remote control 10 according to an exemplary embodiment of the present disclosure, the first PCB 210 may be located below the second PCB 220. Thus, a distance between the first button 110 and the first PCB 210 may be greater than a distance between the second button 120 and the second PCB 220.

The remote control 10 according to an exemplary embodiment of the present disclosure may further include a pusher 300 arranged between the first button 110 and the first PCB 210, and coming into contact with the first switch terminal 212 and pressing the first switch terminal 212 when the first button 110 moves downward. That is, the pusher 300 may transmit a force applied to the first button 110 to the first switch terminal 212.

Referring to FIGS. 3 and 4, the remote control 10 according to an exemplary embodiment of the present disclosure may further include a block portion 400 provided under the first button 110, that is, the top cover, and fixedly coupled to the first button 110. An upper area of the pusher 300 may face the block portion 400. According to an exemplary embodiment of the present disclosure, when the first button 110 moves downward, the block portion 400 fixedly coupled to the first button 110 may also move downward, and accordingly the block portion 400 may interfere with the pusher 300 to press the pusher 300 downward.

In addition, the remote control 10 according to an exemplary embodiment of the present disclosure may further include a first plate 500 provided under the block portion 400. An opening may be defined in the block portion 400, and the second button 120 and the first plate 500 may face each other through the opening. When the second button 120 moves downward, it may interfere with the first plate 500. Thus, when the second button 120 moves downward, the first plate 500 may be pressed downward to press the second switch terminal 222 (see FIGS. 1 and 2) whereby the second function may be performed.

Figure 5:
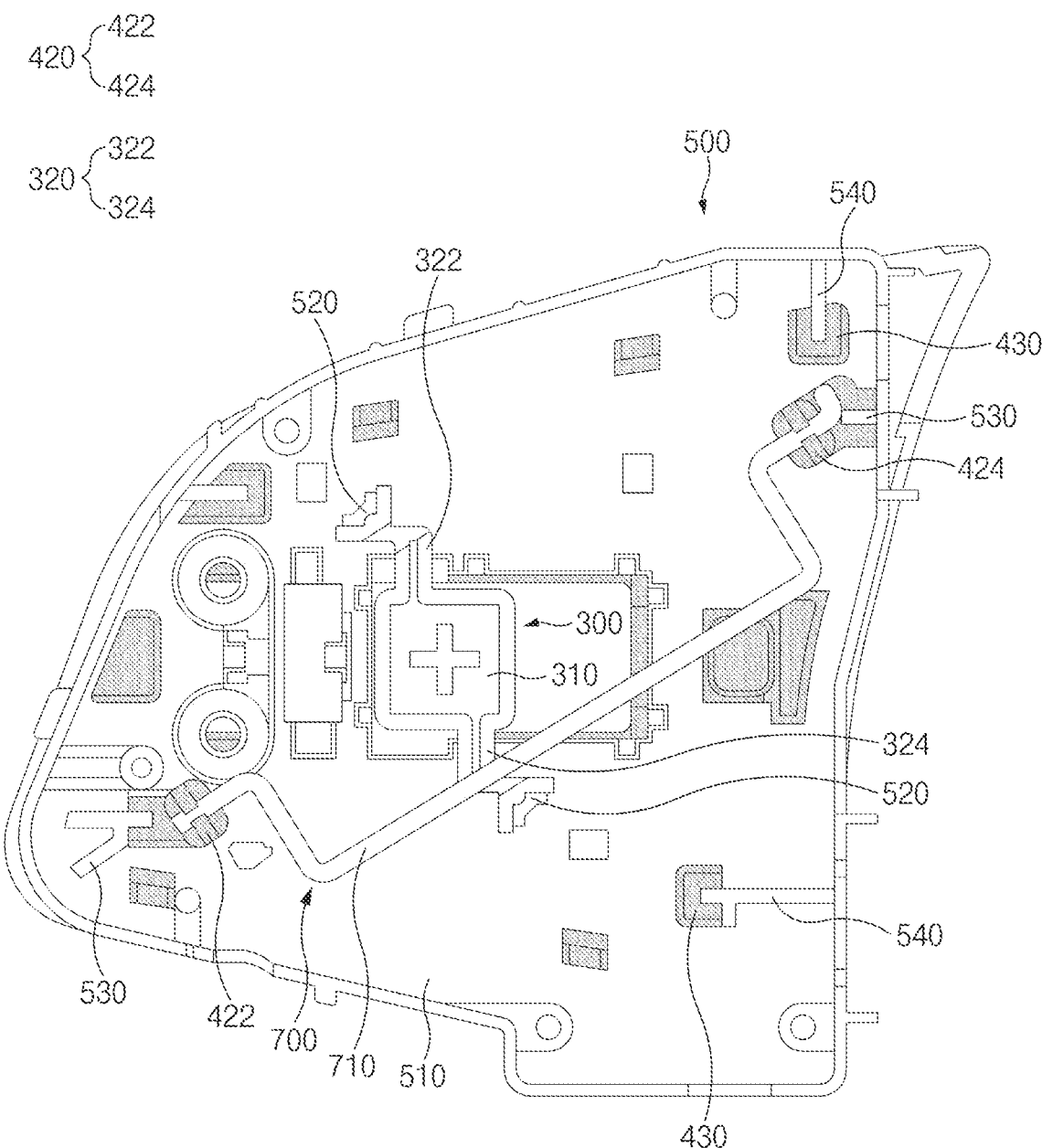
FIG. 5 is a bottom view of a steering wheel remote control according to an exemplary embodiment of the present disclosure, which is viewed from the bottom of a first plate.
Figure 6:
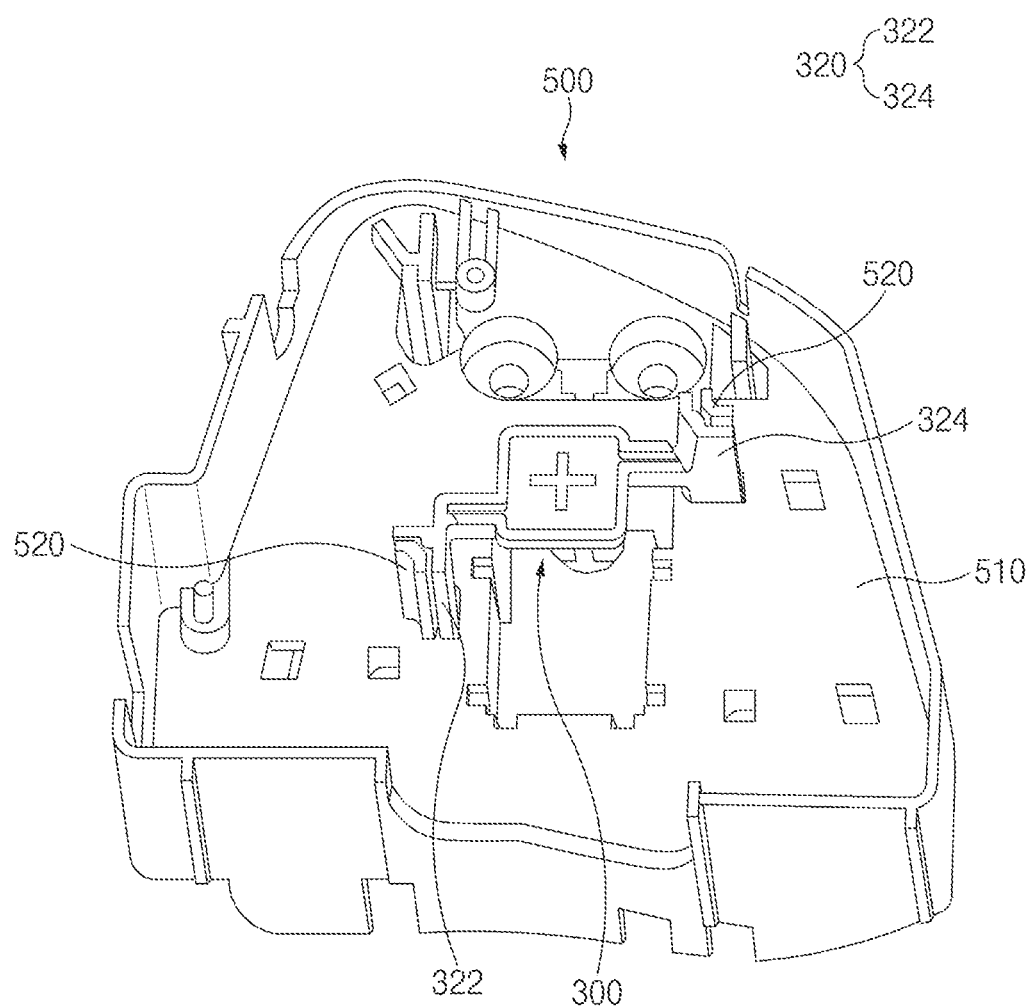
FIG. 6 is a perspective view of a coupling structure between a pusher and a first plate in a steering wheel remote control according to an exemplary embodiment of the present disclosure.

FIG. 5 is a bottom view of a steering wheel remote control according to an exemplary embodiment of the present disclosure, which is viewed from the bottom of a first plate; FIG. 6 is a perspective view of a coupling structure between a pusher and a first plate in a steering wheel remote control according to an exemplary embodiment of the present disclosure; and FIG. 7 is a perspective view of interference between a pusher and a block portion in a steering wheel remote control according to an exemplary embodiment of the present disclosure.

Figure 7:
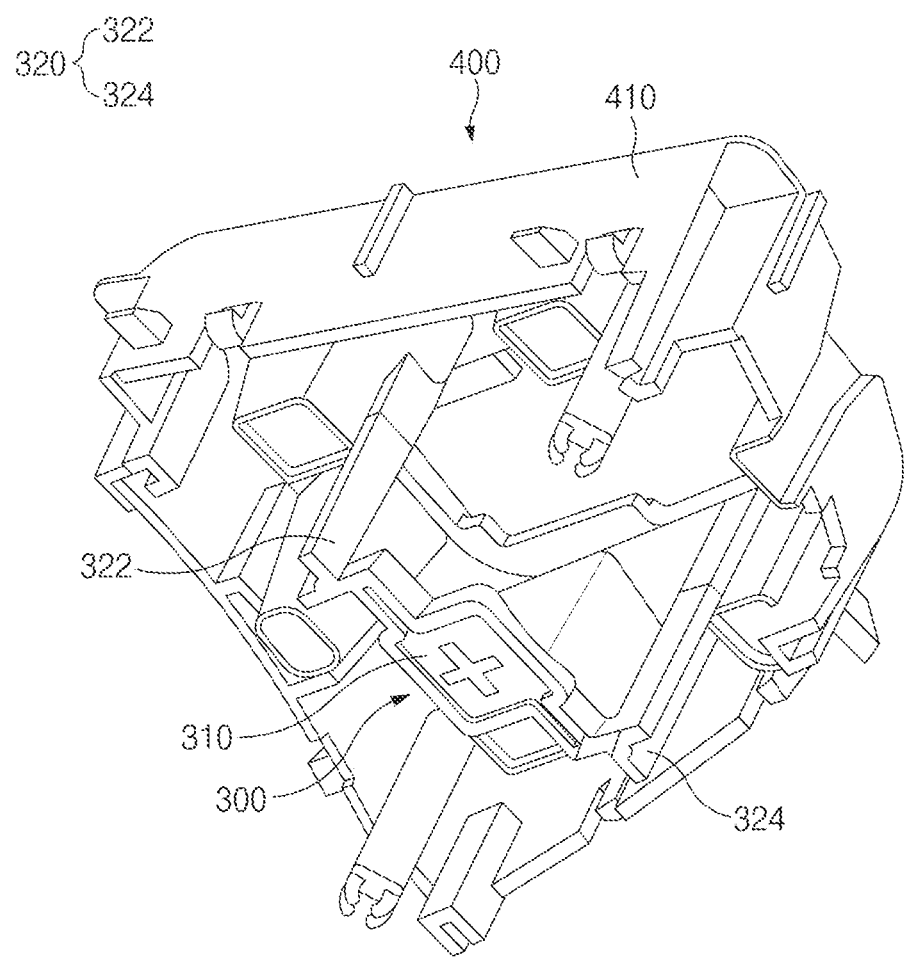
FIG. 7 is a perspective view of the relationship of interference between a pusher and a block portion in a steering wheel remote control according to an exemplary embodiment of the present disclosure.

Referring to FIGS. 5 to 7, the pusher 300 may include a plurality of areas. For example, the pusher 300 may include a body portion 310 provided above the first switch terminal 212 (see FIG. 3) and facing the first switch terminal 212, and an extension portion 320 extending upward from the body portion 310. Here, the extension portion 320 may face a bottom surface of the block portion 400 as illustrated in FIG. 7. Thus, according to an exemplary embodiment of the present disclosure, when the first button 110 moves downward, the extension portion 320 may be pressed downward and the body portion 310 may press the first switch terminal 212, whereby the first function may be performed. More specifically, when the first button 110 moves downward, the block portion 400 may interfere with the extension portion 320 to press the extension portion 320 downward.

As described above, the body portion 310 of the pusher 300 may face the first switch terminal 212, and the first PCB 210 on which the first switch terminal 212 is provided may be located below the second PCB 220.

Thus, the pusher 300 needs to pass through the second PCB 220. More specifically, the extension portion 320 of the pusher 300 may extend upward from the body portion 310 through the second PCB 220. Accordingly, the extension portion 320 may face the block portion 400.

The extension portion 320 of the pusher 300 may include a first extension portion 322 and a second extension portion 324. As illustrated in FIGS. 5 to 7, the first extension portion 322 and the second extension portion 324 may have a symmetrical shape with the body portion 310 placed therebetween. When the first button 110 moves downward to perform the first function, the pusher 300 may stably move in the vertical direction, and thus the structural stability of the remote control 10 may be ensured.

Based on the above descriptions, the first plate 500 as well as the second PCB 220 may be provided between the block portion 400 and the first PCB 210. Thus, the pusher 300 may pass through the first plate 500 as well as the second PCB 220. More specifically, the extension portion 320 of the pusher 300 may extend upward through the first plate 500.

According to an exemplary embodiment of the present disclosure, the vertical movement of the pusher 300 may be guided by the first plate 500.

To this end, referring to FIGS. 5 and 6, the first plate 500 may include a first plate body 510 forming a body of the first plate 500, and a pusher guide member 520 provided adjacent to an area of a bottom surface of the first plate body 510 through which the extension portion 320 of the pusher 300 passes, and extending downward. The pusher guide member 520 may extend in the vertical direction in which the pusher 300 moves. More specifically, the pusher guide member 520 may face the extension portion 320 on the side of the extension portion 320. More preferably, in order to more effectively guide the vertical movement of the pusher 300, a shape of the pusher guide member 520 may correspond to that of the extension portion 320 in an area in which the extension portion 320 and the pusher guide member 520 face each other. For example, as illustrated in FIGS. 5 and 6, a horizontal cross-section of the extension portion 320 and a horizontal cross-section of the pusher guide member 520 may have an L shape in the area in which the extension portion 320 and the pusher guide member 520 face each other. According to an exemplary embodiment of the present disclosure, due to the presence of the pusher guide member 520, the movement of the pusher 300 in the vertical direction according to the pressing of the first button 110 may be effectively guided, and the movement of the pusher 300 in any other directions than the vertical direction may be prevented.

Figure 8:
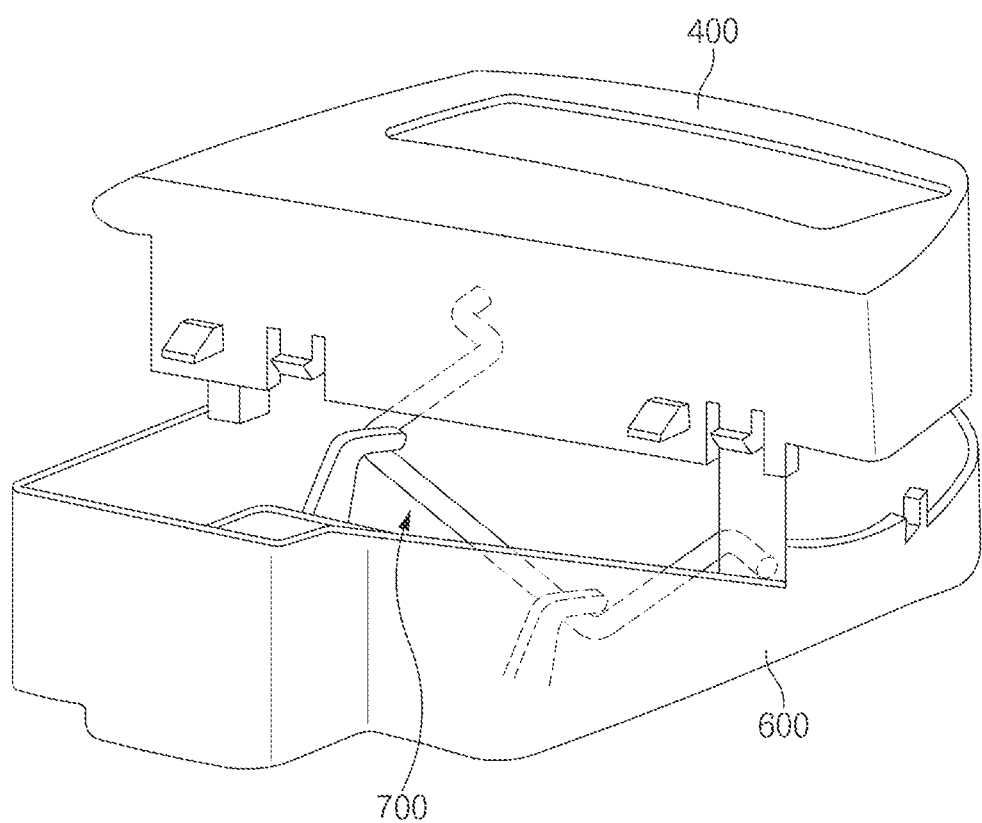
FIG. 8 is a perspective view of a coupling structure between a block portion, a second plate, and a stabilizer in a steering wheel remote control according to an exemplary embodiment of the present disclosure.
Figure 9:
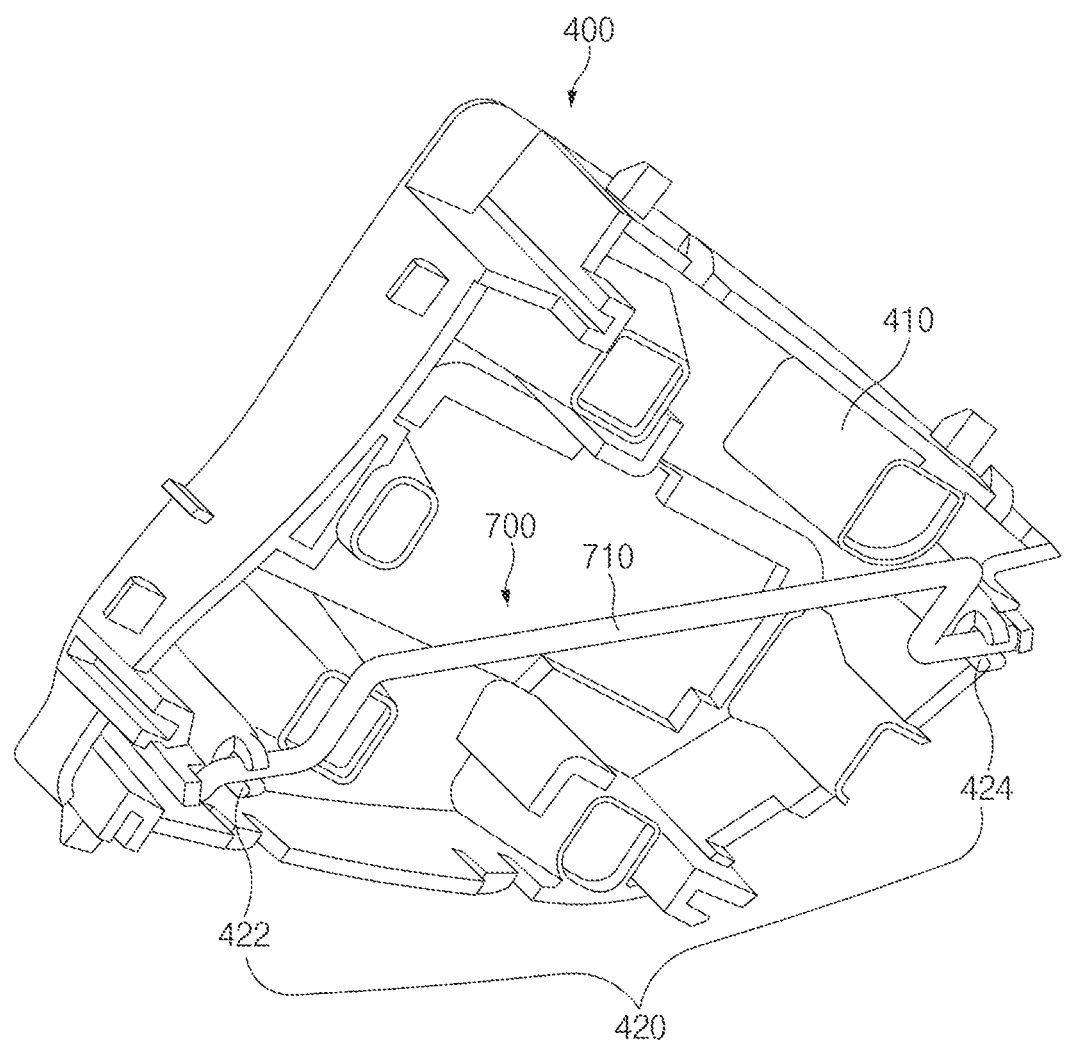
FIG. 9 is a perspective view of a coupling structure between a block portion and a stabilizer in a steering wheel remote control according to an exemplary embodiment of the present disclosure.

FIG. 8 is a perspective view of a coupling structure between a block portion, a second plate, and a stabilizer in a steering wheel remote control according to an exemplary embodiment of the present disclosure; FIG. 9 is a perspective view of a coupling structure between a block portion and a stabilizer in a steering wheel remote control according to an exemplary embodiment of the present disclosure; and FIG. 10 is a perspective view of a coupling structure between a second plate and a stabilizer in a steering wheel remote control according to an exemplary embodiment of the present disclosure.

Figure 10:
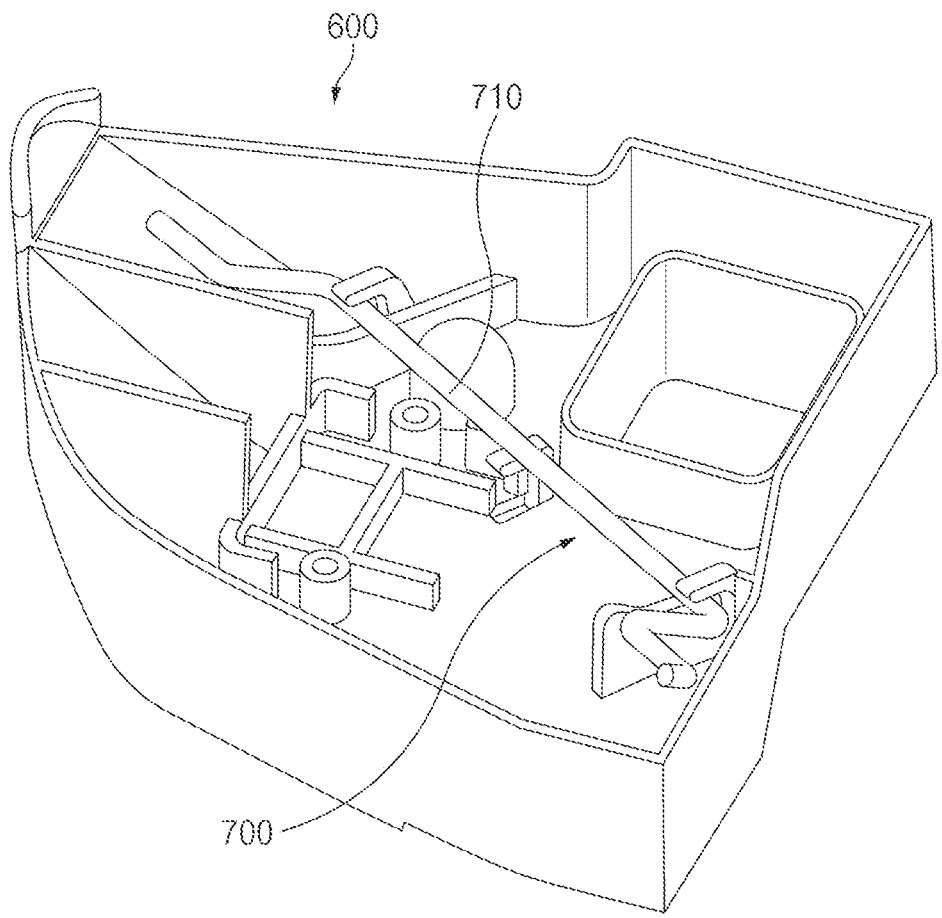
FIG. 10 is a perspective view of a coupling structure between a second plate and a stabilizer in a steering wheel remote control according to an exemplary embodiment of the present disclosure.

Referring to FIGS. 8 to 10, the remote control 10 according to an exemplary embodiment of the present disclosure may further include a stabilizer 700 coupled to the block portion 400 on the bottom surface of the block portion 400, and provided transverse to the bottom surface of the block portion 400.

When the first button 110 of the remote control 10 is pressed, and a peripheral area of the first button 110 other than a central area of the first button 110 is pressed, the pressed area may move downward relatively much, but an area of the first button 110 far from the pressed area may move downward relatively less. In this case, the first button 110 may tilt to one side, which is not desirable in terms of operation feeling and durability of the remote control 10.

The stabilizer 700 may be provided to minimize the one-sided tilt of the first button 110 even when the peripheral area of the first button 110 is pressed. That is, since the stabilizer 700 is coupled to the block portion 400 and provided transverse to the bottom surface of the block portion 400, it may allow the area of the first button 110 far from the pressed area of the first button 110 to move downward together with the pressed area.

The block portion 400 may include a coupling portion 420 coupled to an end portion of the stabilizer 700. More specifically, as illustrated in FIGS. 5 and 9, the coupling portion 420 may include a first coupling portion 422 and a second coupling portion 424 coupled to both end portions of the stabilizer 700, respectively. The coupling portion 420 may be provided on a bottom surface of a block portion body 410 forming a body of the block portion 400.

Referring to FIGS. 4, 8, and 10, the remote control 10 according to an exemplary embodiment of the present disclosure may further include a second plate 600 provided under the pusher 300 and the first PCB 210. In addition, as illustrated in FIGS. 8 to 10, the stabilizer 700 may include a projection area 710 protruding downward. For example, the projection area 710 may be provided on a central area of the stabilizer 700 in a longitudinal direction in which the stabilizer 700 extends.

As illustrated in FIG. 10, the stabilizer 700 may be coupled to the second plate 600. More specifically, the stabilizer 700 and the second plate 600 may be coupled in the projection area 710. When the stabilizer 700 is coupled to the second plate 600 as well as the block portion 400, the stabilizer 700 may be fixed more stably inside the remote control 10, thereby effectively resolving the one-sided tilt of the first button 110.

As illustrated in FIG. 5, the first coupling portion 422 and the second coupling portion 424 of the block portion may extend downward through the first plate 500. Thus, the stabilizer 700 coupled to the first coupling portion 422 and the second coupling portion 424 may also be provided under the first plate 500.

The first plate 500 may further include a coupling portion guide member 530 provided adjacent to an area of a bottom surface of the first plate 500 through which the first coupling portion 422 and the second coupling portion 424 pass, and extending downward. More specifically, the coupling portion guide member 530 may be provided on the bottom surface of the first plate body 510. Similar to the pusher guide member 520, the coupling portion guide member 530 may guide a vertical movement of the coupling portion 420 according to the pressing of the first button 110. To this end, the coupling portion guide member 530 may face the coupling portion 420 on the side of the coupling portion 420. Since the coupling portion 420 includes the plurality of coupling portions, the coupling portion guide member 530 may also include a plurality of guide members.

In order for the coupling portion guide member 530 to effectively perform a guide function, a shape of the coupling portion guide member 530 may correspond to that of the coupling portion 420 in an area in which the coupling portion 420 and the coupling portion guide member 530 face each other. For example, as illustrated in FIG. 5, a horizontal cross-section of the coupling portion 420 may include a U-shape section in the area in which the coupling portion 420 and the coupling portion guide member 530 face each other. In addition, a horizontal cross-section of the coupling portion guide member 530 may include an I-shape section inserted into the U-shape section in the area in which the coupling portion 420 and the coupling portion guide member 530 face each other. In this case, the coupling portion guide member 530 may guide the vertical movement of the coupling portion 420 more stably.

Referring to FIG. 5, the pusher 300 and the stabilizer 700 may intersect each other. More specifically, a direction in which the first extension portion 322 and the second extension portion 324 of the pusher 300 face each other may intersect with a direction in which the stabilizer 700 is transverse to the block portion 400 or the first plate 500. In FIG. 5, the pusher 300 and the stabilizer 700 may intersect and overlap each other at a particular point when the remote control 10 is viewed from the bottom. More preferably, the direction in which the first extension portion 322 and the second extension portion 324 of the pusher 300 face each other may be perpendicular to the direction in which the stabilizer 700 is transverse to the block portion 400 or the first plate 500.

Referring to FIG. 5, the block portion may further include a penetrating portion 430 provided on a peripheral area of the bottom surface of the block portion and extending downward through the first plate 500. More specifically, the penetrating portion 430 may pass through the first plate 500 separately from the coupling portion 420. FIG. 5 illustrates two penetrating portions 430 which are provided to extend through an upper right portion and a lower right portion of a peripheral area of the first plate 500.

According to an exemplary embodiment of the present disclosure, the first plate 500 may further include a penetrating portion guide member 540 provided adjacent to an area of the bottom surface of the first plate 500 through which the penetrating portion 430 passes, and extending downward. More specifically, the penetrating portion guide member 540 may be provided on the bottom surface of the first plate body 510.

Similar to the pusher guide member 520 and the coupling portion guide member 530, the penetrating portion guide member 540 may guide a vertical movement of the penetrating portion 430 according to the pressing of the first button 110. To this end, the penetrating portion guide member 540 may face the penetrating portion 430 on the side of the penetrating portion 430. Since the penetrating portion 430 includes the plurality of penetrating portions, the penetrating portion guide member 540 may also include a plurality of guide members.

In order for the penetrating portion guide member 540 to effectively perform a guide function, a shape of the penetrating portion guide member 540 may correspond to that of the penetrating portion 430 in an area in which the penetrating portion 430 and the penetrating portion guide member 540 face each other. For example, as illustrated in FIG. 5, a horizontal cross-section of the penetrating portion 430 may include a U-shape section in the area in which the penetrating portion 430 and the penetrating portion guide member 540 face each other. In addition, a horizontal cross-section of the penetrating portion guide member 540 may include an I-shape section inserted into the U-shape section in the area in which the penetrating portion 430 and the penetrating portion guide member 540 face each other. In this case, the penetrating portion guide member 540 may guide the vertical movement of the penetrating portion 430 more stably.

Vehicle

A vehicle according to an exemplary embodiment of the present disclosure may include a steering wheel and a steering wheel remote control 10 (hereinafter, referred to as "the remote control") mounted on the steering wheel. Here, the remote control 10 may include a first button 110 and a second button 120 provided on a top surface thereof and moving downward, and a first PCB 210 and a second PCB 220 provided under the first button 110 and the second button 120.

In addition, the first PCB 210 may be provided with a first switch terminal 212 which is pressed downward to perform a first function when the first button 110 moves downward, and the second PCB 220 may be provided with a second switch terminal 222 which is pressed downward to perform a second function when the second button 120 moves downward. According to an exemplary embodiment of the present disclosure, the first PCB 210 and the second PCB 220 may be spaced apart from each other in a vertical direction. The configuration and structure of the remote control 10 will be based on the above descriptions with reference to the accompanying drawings.

As set forth above, according to exemplary embodiments of the present disclosure, the degree of freedom in designing the steering wheel remote control may be improved by resolving interference between tact switches according to the arrangement of the tact switches.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A steering wheel remote control for a vehicle, the steering wheel remote control comprising:
   a first button and a second button arranged on a top surface of the remote control, the first and second buttons configured to move downward when being pressed;
   a first printed circuit board (PCB) and a second PCB each of which arranged under the first button and the second button;
   a pusher arranged between the first button and the first PCB;
   a block portion arranged under the first button and fixedly coupled to the first button; and
   a first plate arranged under the block portion,
   wherein the first PCB comprises a first switch terminal configured to be pressed downward to perform a first function when the first button moves downward,
   wherein the second PCB comprises a second switch terminal configured to be pressed downward to perform a second function when the second button moves downward,
   wherein the first PCB and the second PCB are spaced apart from each other in a vertical direction,
   wherein the first PCB is located below the second PCB,
   wherein the pusher is configured to contact the first switch terminal and press the first switch terminal when the first button moves downward, wherein the pusher includes:
   a body portion arranged to be above the first switch terminal and facing the first switch terminal; and
   an extension portion extending upward from the body portion, and
wherein, when the first button moves downward, the extension portion is configured to be pressed downward while the body portion presses the first switch terminal for performing the first function,
wherein the extension portion faces the block portion,
wherein, when the first button moves downward, the block portion interferes with the extension portion to press the extension portion downward,
wherein an opening is defined in the block portion,
wherein the second button and the first plate face each other through the opening, and
wherein, when the second button moves downward, the first plate is configured to be pressed downward to press the second switch terminal for performing the second function.

2. The steering wheel remote control according to claim 1, wherein the first button is configured as a top cover arranged on the top surface of the remote control, and
   wherein the second button is disposed on to be within the top cover.

3. The steering wheel remote control according to claim 1, wherein the first switch terminal and the second switch terminal are arranged to partially overlap with each other when the remote control is viewed from top.

4. The steering wheel remote control according to claim 1, wherein the extension portion extends upward through the second PCB.

5. The steering wheel remote control according to claim 1, wherein the extension portion extends upward through the first plate.

6. The steering wheel remote control according to claim 5, wherein the first plate includes a pusher guide member arranged to be adjacent to a portion of a bottom surface of the first plate through which the extension portion passes, the pusher guide member extending downward,
   wherein the pusher guide member faces the extension portion on a side of the extension portion, and
   wherein a shape of the pusher guide member corresponds to that of the extension portion in an area in which the extension portion and the pusher guide member face each other.

7. The steering wheel remote control according to claim 1, wherein the extension portion includes a first extension portion and a second extension portion, and
   wherein the first extension portion and the second extension portion have a symmetrical shape with the body portion arranged therebetween.

8. The steering wheel remote control according to claim 6, wherein a horizontal cross-section of the extension portion and a horizontal cross-section of the pusher guide member have an L shape in the area in which the extension portion and the pusher guide member face each other.

9. The steering wheel remote control according to claim 7, further comprising a stabilizer coupled to the block portion on a bottom surface of the block portion, the stabilizer arranged to be transverse to the block portion.

10. The steering wheel remote control according to claim 9, wherein the block portion includes a first coupling portion and a second coupling portion coupled to both end portions of the stabilizer, respectively, and
    wherein the first coupling portion and the second coupling portion extend downward through the first plate.

11. The steering wheel remote control according to claim 10, wherein the first plate includes a coupling portion guide member arranged to be adjacent to an area of a bottom surface of the first plate through which the first coupling portion and the second coupling portion pass, the coupling portion extending downward,
    wherein the coupling portion guide member faces the coupling portion on a side of the coupling portion, and
    a shape of the coupling portion guide member corresponds to that of the coupling portion in an area in which the coupling portion and the coupling portion guide member face each other.

12. The steering wheel remote control according to claim 11, wherein a horizontal cross-section of the coupling portion includes a U-shape section in the area in which the coupling portion and the coupling portion guide member face each other, and
    wherein a horizontal cross-section of the coupling portion guide member includes an I-shape section configured to be fitted into the U-shape section in the area in which the coupling portion and the coupling portion guide member face each other.

13. The steering wheel remote control according to claim 9, wherein a direction in which the first extension portion and the second extension portion face each other intersects with a direction in which the stabilizer is transverse to the block portion.

14. The steering wheel remote control according to claim 9, further comprising a second plate arranged under the pusher,
    wherein the stabilizer includes a projection area extending downward, and
    wherein the stabilizer and the second plate are coupled in the projection area.

15. The steering wheel remote control according to claim 10, wherein the block portion further includes a penetrating portion arranged on a peripheral area of the bottom surface of the block portion and extending downward through the first plate.

* * * * *